(12) United States Patent
Araki et al.

(10) Patent No.: US 6,444,338 B1
(45) Date of Patent: Sep. 3, 2002

(54) FUEL CELL SYSTEM WITH IMPROVED STARTABILITY

(75) Inventors: Yasushi Araki, Gotenba; Shigeaki Murata; Hitoshi Hamada, both of Susono, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/453,076

(22) Filed: Dec. 2, 1999

(30) Foreign Application Priority Data

Dec. 2, 1998 (JP) ............................................. 10-342489

(51) Int. Cl.[7] ................................................ H01M 8/04
(52) U.S. Cl. ............................ 429/24; 429/26; 429/22; 429/34; 429/39; 429/12; 429/13
(58) Field of Search ............................. 429/12, 13, 22, 429/24, 26, 34, 39

(56) References Cited

U.S. PATENT DOCUMENTS 6,294,278 B1 * 9/2001 Wohr et al. .................... 429/24

FOREIGN PATENT DOCUMENTS

| JP | 405041229 A | * | 2/1993 | ............ H01M/8/04 |
| JP | 405159792 A | * | 6/1993 | ............ H01M/8/04 |
| JP | 406176777 A | * | 6/1994 | ............ H01M/8/04 |
| RU | 2076405 C1 | * | 11/1993 | ............ H01M/16/00 |

* cited by examiner

Primary Examiner—Patrick Ryan
Assistant Examiner—Angela J. Martin
(74) Attorney, Agent, or Firm—Oblon, Spivak, McClelland, Maier & Neustadt, P.C.

(57) ABSTRACT

A fuel cell system in which warm up of the fuel cell is promoted at the time of starting and the fuel cell is operated under steady condition in a short time. The fuel cell has a plurality of power generator portions. A circulating water passage connected to the power generator portions are changed so that circulating water flows in just part of the generator when the temperature of the fuel cell is not higher than the predetermined value.

17 Claims, 4 Drawing Sheets

FUEL CELL SYSTEM WITH IMPROVED STARTABILITY

INCORPORATION BY REFERENCE

The disclosure of Japanese Patent Application No. HEI 10-342489 filed on Dec. 2, 1998 including the specification, drawings and abstract is incorporated herein by reference in its entirety.

BACKGROUND OF THE INVENTION

1. Field of Invention

This invention relates to a fuel cell system, more particularly, to a fuel cell system with improved startability.

2. Description of Related Art

In a system relying on fuel cells for the generation of electrical power, the amount of electric power consumed by the load is not always constant. When the fuel cells are designed based on the maximum required power of the load, a high power generation efficiency of the fuel cells cannot be obtained. If the performance of the fuel cells is determined based on maximum power required by a load, it is difficult to maintain high power generation efficiency when the required power drops.

It has been considered to divide the power generating portion of a fuel cell into a plurality of portions and to control each portion based on the required power of the load. For example, Japanese Patent Laid-Open Application No. HEI 04-262370 discloses such technology.

At the time of starting a fuel cell, it is preferable to warm-up the fuel cell so that its temperature is increased to the operational temperature in a short time. To warm up for hours may produce undesirable results. For example, in case of using a reformed gas as the fuel gas, carbon monoxide contained in the reformed gas may poison the electrodes in the fuel cell. However, the related art does not disclose how to increase the temperature of the fuel cell up to the operational temperature at the time of starting.

SUMMARY OF THE INVENTION

Accordingly, it is an object of this invention to provide a fuel cell system which can reduce the warm up time for the fuel cells in the system and can operate the fuel cells stability in a shorter time.

In order to achieve this and other objects, the fuel cell has a plurality of power generator portions. A fluid flow passage connected to the power generator portions is changed so that circulating water flows in just part of the generator when the temperature of the fuel cell is not higher than the predetermined value. Accordingly, since the heat capacity of a portion where the fluid flows can be reduced, the temperature of the fluid is raised easily. Thus it is possible to warm up the fuel cell in a shorter time.

In accordance with one aspect of this invention, there is provided a fuel cell system having a plurality of power generator portions. A fluid flow passage is connected to the plurality of power generator portions so as to selectively supply a heating or cooling fluid to selected ones of said plurality of power generator portions. At least one switching device is associated with the fluid flow passage so as to switch the fluid flow passages to supply heating or cooling fluid to at least one of said plurality of power generator portions.

According to this aspect of the invention, a passage controller may be operatively connected to the at least one switching device and is configured to cause the at least one switching device to switch the fluid flow passage based on the temperature of the fuel cell.

According to another aspect of the invention, a fuel cell system comprises a fuel cell having a plurality of power generator portions; a fuel gas passage connected to selectively supply fuel gas to the power generator portions of said fuel cell; at least one switching device associated with the fuel gas passage so as to switch the fuel gas flow to at least one of said plurality of power generator portions.

According to this aspect of the invention, a gas passage controller may be operatively connected to the at least one switching device and configured to cause the at least one switching device to switch the fuel gas passage to a configuration such that the plurality of power generators will generate a maximum heat output, as compared to other switched configurations of the gas passage, based on the temperature of the fuel cell.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Figure 1:
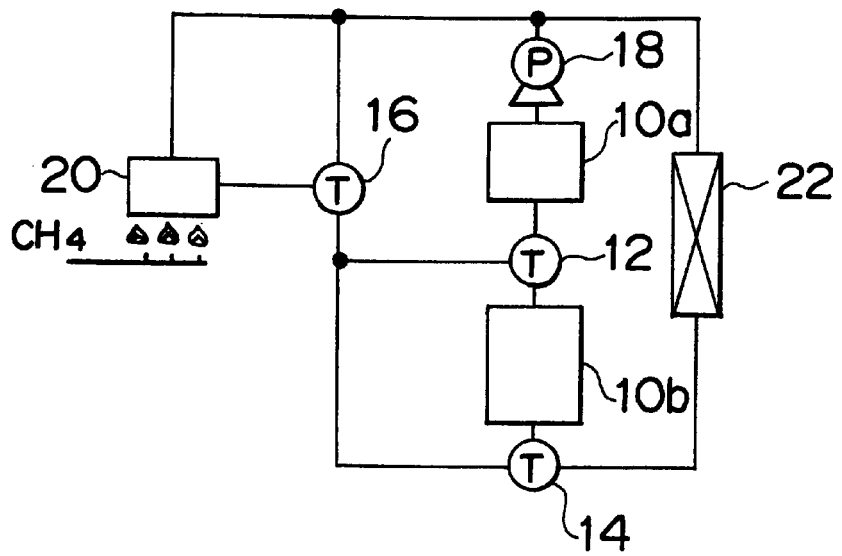
FIG. 1 is a schematic diagram of a fuel cell system of a first embodiment of this invention.

FIG. 1 is a schematic diagram of fuel cell system of the first embodiment of this invention. In the system, The power generator portion of the fuel cell is divided into two portions, that is portions 10a and 10b. The ON/OFF state of each power generator portion is switched depend on a required power of a load connected with the fuel cell system. For example, either or both of the power generator portions 10a and 10b may be connected to the load.

The power generator portions 10a and 10b are each connected with a circulating water passage. The circulating water is circulated in the passage by a pump 18 and warms or cools the power generator portions 10a and 10b, depending on its temperature. Switching devices such as valves 12, 14 and 16 are connected with the circulating water passage so that the circulating water within the passage can flow as required. Additionally, a heater 20 is connected to the circulating water passage, which heats the circulating water by burning methane, for example. A cooling device 22 is also connected to the circulating water passage. The cooling device 22 cools down the circulating water when the power generator portions 10a and 10b generate excess heat with an increase of generated power.

Although not illustrated, it is to be understood that the valves, the pump 18, the heater 20 and a supply of fuel gas are controlled by an electronic controller such as a microcomputer, a hard wired electrical device having a memory or any other type of controller capable of performing the functions of the controller, which receives water temperature signals from sensors associated with the circulating water passage.

Figure 2:
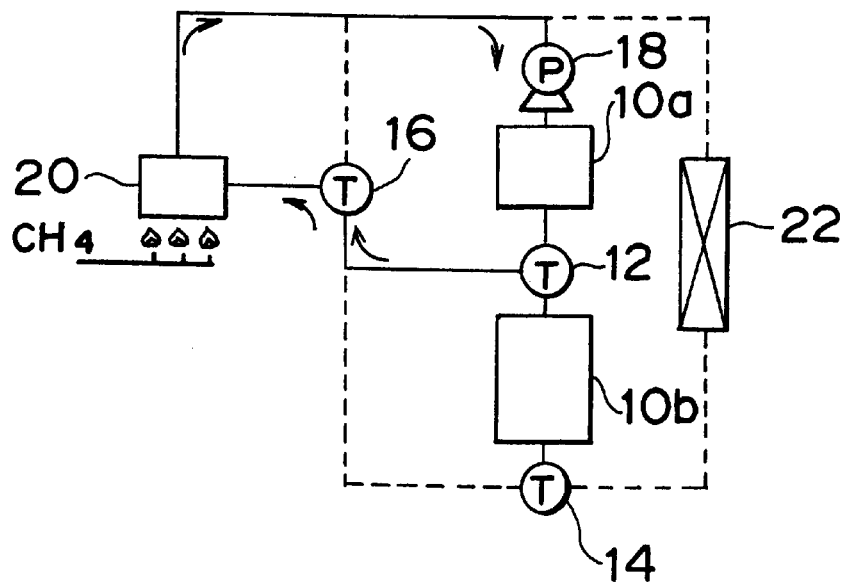
FIG. 2 shows a flow of circulating water in the fuel cell system.

FIG. 2 shows a flow of the circulating water when the temperature of the circulating water is not higher than a predetermined value at the time of starting the fuel cell, and where only the power generator portion 10a is connected to the load. The valve 14 is closed and the valves 12 and 16 are adjusted so that the circulating water is circulated between the power generator portion 10a and the heater 20. In FIG. 2, a broken line means that the circulating water does not flow in the passage. Thus, the heated circulating water just flows in the power generator portion 10a and not the power generator portion 10b. Accordingly, it is possible to warm the power generator portion 10a up to the desired operating temperature in a short time as compared with in case of warming both power generator portions 10a and 10b. It is preferable to make the power generator portion 10a, where the circulating water flow at first, smaller than the power generator portion 10b. In such a case, due to its small heat capacity, the temperature can rise easily.

Figure 3:
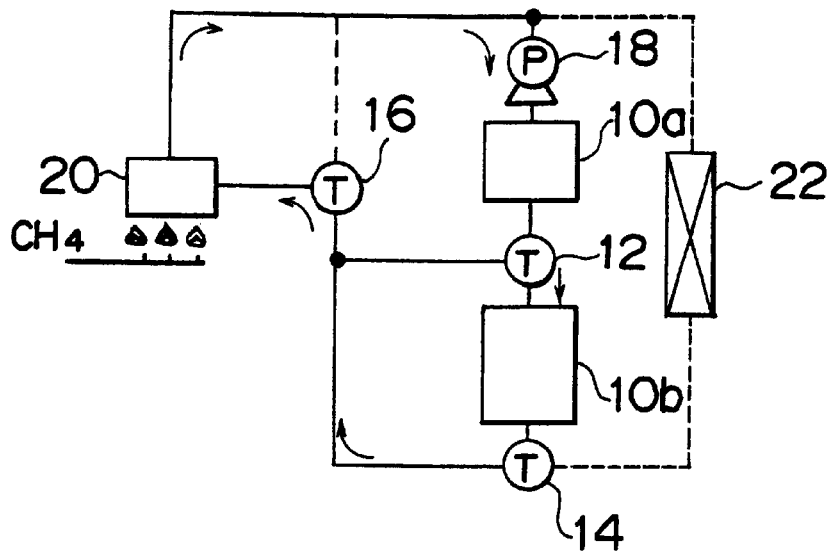
FIG. 3 shows another flow of circulating water in the fuel cell system.

As described above, only the power generator portion 10a is heated while the temperature of the fuel cell is not higher than the predetermined value. After the temperature rises to the predetermined value, the circulating water passage is switched to that shown in FIG. 3 by controlling the valves 12 and 14. As shown in FIG. 3, the circulating water can flow through the power generator portions 10a and 10b. At this time, the power generator portion 10a has already generated enough power to require cooling. Due to the heat generated by the power generator portion 10a, warmed circulating water can be supplied from it to the other power generator portion 10b. Thus, it is possible to reduce the time for warm up of the power generator portion 10b.

Figure 4:
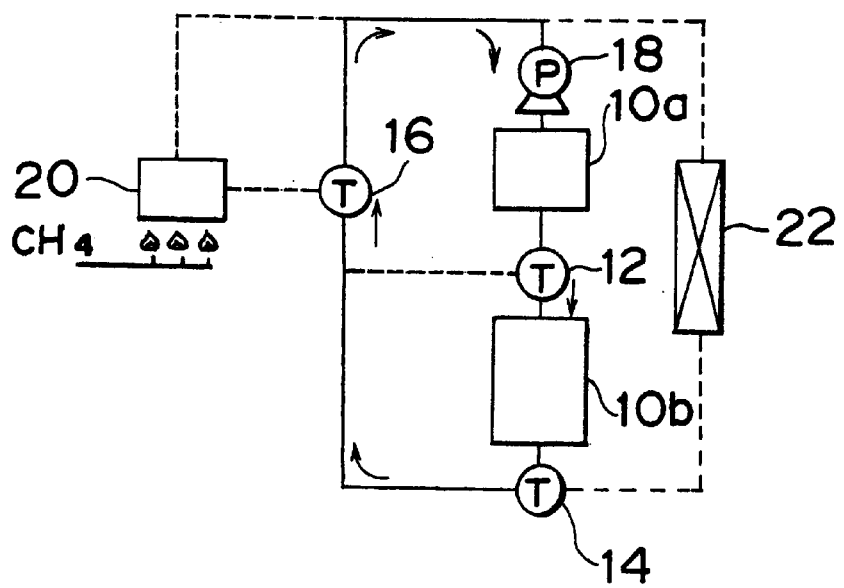
FIG. 4 shows another flow of circulating water in the fuel cell system.
Figure 5:
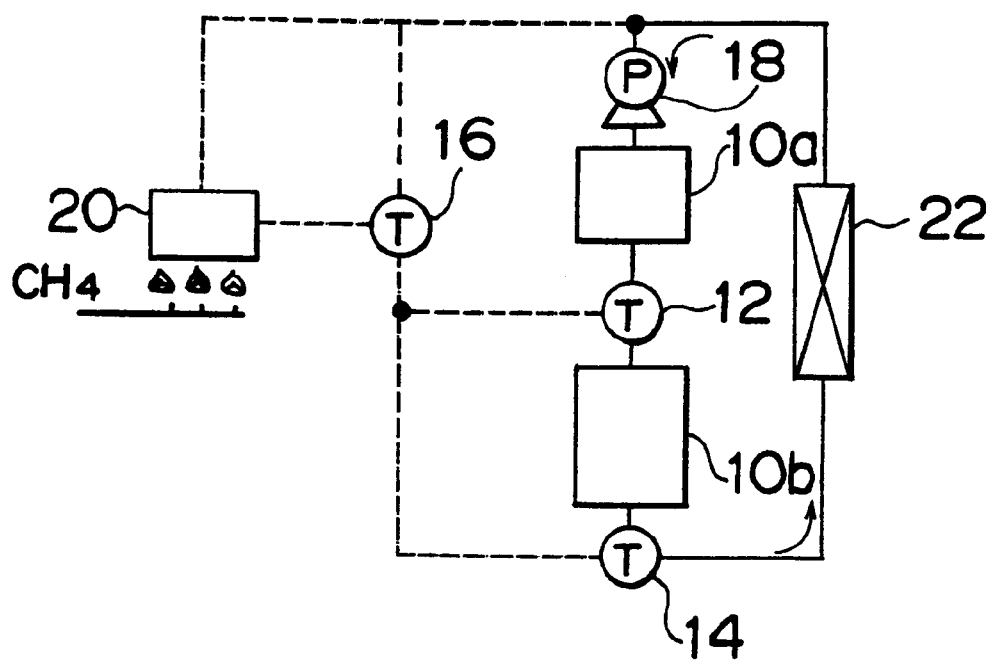
FIG. 5 shows another flow of circulating water in the fuel cell system.

After the power generator portion 10b begins to generate enough power, it is not necessary to heat the circulating water by using heater 20. Then the circulating water passage is switched to that shown in FIG. 4 by controlling the valves 12, 14 and 16. In this case, the circulating water is circulated only thorough the power generator portions 10a and 10b and not the heater 20. Once the power generator portions 10a and 10b generate enough power that their temperatures become excessive, it is necessary to cool down the circulating water. Therefore, the circulating water passage is switched to that shown in FIG. 5 by controlling the valves 12 and 14. FIG. 5 shows a flow of the circulating water when the fuel cell is operated under steady state conditions. At that time the fuel cell generates sufficient power.

According to this embodiment, since the fuel cell has a plurality of power generator portions and only one of the power generator portions (10a) is warmed at the time of starting the fuel cell, it is possible to warm up the fuel cell in a short time. Further, by using the heat generated by the power generator portion (10a) in addition to heat from heater 20, the other power generator portion (10b) can be warmed up quickly.

In the above embodiment, it is possible to divide the power generator into more than two parts. For example, the number of power generator portions can be determined based on a use of the fuel cell or a change of the load.

Figure 6:
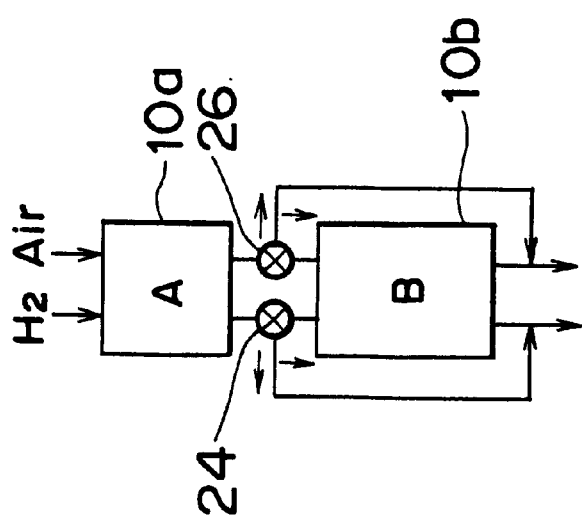
FIG. 6 is a schematic diagram of a fuel cell system of a second embodiment of this invention.

FIG. 6 is a schematic diagram of fuel cell system of the second embodiment of this invention. The fuel cell also has two power generator portions 10a and 10b. Fuel gas (i.e., hydrogen and air) can be supplied to the both power generator portions 10a and 10b. It is also possible to supply the fuel gas to only the power generator portion 10a and not power generator portion 10b by adjusting valves 24 and 26 provided in the gas passage.

Figure 7:
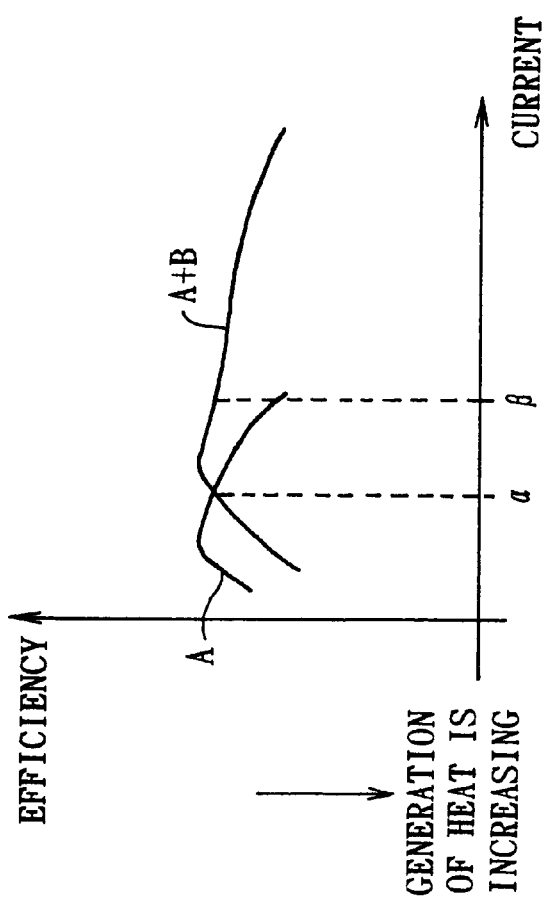
FIG. 7 is a graph showing a relationship between the current and power generation efficiency.

FIG. 7 shows a relationship between required current and power generation efficiency of the fuel cell. In FIG. 7, line "A" shows the relationship when only the power generator portion 10a is used. Line "A+B" shows the relationship when both of the power generator portions 10a and 10b are used.

As shown in FIG. 7, voltage increases in accordance with increasing of current before a peak point. In contrast, after the peak point, voltage decreases in accordance with increasing of current. High voltage corresponds to high efficiency of the power generation. During low voltage conditions, energy generated by the fuel cell is converted to heat, so that the amount of heat generated by each generator portion 10a and 10b increases. Therefore, at the time of warming up of the fuel cell, it is preferable to operate the fuel cell under conditions where power generation efficiency is low and the generation of heat is high. In this embodiment, both of the power generator portions 10a and 10b are operated when the required current is lower than α shown in FIG. 7. Further, when the required current is between α and β, only the power generator portion 10a is operated so that generation of heat is high. According to such operation, it is possible to reduce the time of warming up the fuel cell. It is preferable to switch the gas passage by controlling the valves 24 and 26 so that the power generator portions 10a and 10b can generate the most heat. Accordingly, since the warm up of the fuel cell is promoted and the temperature of the fuel cell reaches the normal operational temperature in a short time, the fuel cell can perform with high startability.

After warming up, the fuel cell is operated with high power generation efficiency.

Further, it is possible to combine the above first and second embodiments to reduce the time for warming up and improve startability.

TABLE 1 shows an operational mode for the fuel cell system of this invention. The data of TABLE 1 may be incorporated into the non-volatile memory of the controller.

TABLE 1

| Circulating Water Temperature T | Cooling | Fuel Supply |
| --- | --- | --- |
| T3 ≦ T | Normal Operation | Normal Operation |
| T2 ≦ T < T3 | 10a + 10b | supply to the power generator portion which generates the most heat |
| T1 ≦ T < T2 | 10a + 10b | 10a |
| T < T1 | 10a | 10a |

In this embodiment, the operating mode is selected from the four steps in accordance with the circulating water temperature T. It is also possible to change the operating mode based on the temperature of the fuel cell.

When the circulating water temperature is not higher than the predetermined value T1 (T<T1), only the power generator portion 10a is heated by circulating water heated by the heater 20 as shown in FIG. 2. After the temperature of the power generator portion 10a reaches the temperature where the power generator portion 10a can generate sufficient power, fuel gas (i.e., hydrogen and oxygen) is supplied to the power generator portion 10a, and the fuel cell starts to generate power.

When the circulating water temperature T is between the first predetermined value T1 and the second predetermined value T2 (T1<T2), the cooling system is changed so that the circulating water passage is connected with two power generator portions 10a and 10b as shown in FIG. 3. In this case, since the power generator portion 10b has not been sufficiently warmed, fuel gas is supplied to only power generator portion 10a.

When the circulating water temperature T is between the second predetermined value T2 and the third predetermined value T3 (T2≦T≦T3), since both of the power generator portions 10a and 10b can generate satisfactory power, fuel gas can be supplied to either of the power generator portions 10a and 10b. At this time, however, the fuel cell is still under warm up condition. Thus, the fuel gas is supplied to the power generator portion which generates the most heat, the same as in the second embodiment. At that time, a flow of the circulating water is selected from FIGS. 3 to 5, based on the circulating water temperature.

Further, after the circulating water temperature exceeds the third predetermined temperature T3, both power generator portions 10a and 10b are operated under normal conditions, so that cooling system and fuel supply system are also operated under normal condition.

As mentioned above, by combining the functions of the cooling system and the fuel supply system, it is possible to provide warming up in a shorter time.

In accordance with this invention, since just a part of the power generator portions of the fuel cell is warmed by circulating water when the temperature of the fuel cell is not higher than a predetermined value, the heat capacity of the portion where the circulating water flows can be reduced, so that the temperature of the circulating water can be increased rapidly. Thus, it is possible to warm up the fuel cell in a short time, so that startability of the fuel cell is improved.

Also, when the temperature of the fuel cell is not higher than a predetermined value, the gas passage is arranged so that the power generating portions can generate the most power and heat. Thus, the fuel cell generates heat by itself, so that the warm up is promoted. Accordingly, it is possible to conclude the warm up of the fuel cell in a short time, so that startability of the fuel cell is improved. Furthermore, after warm up, since the gas passage is changed so that the power generation efficiency of the fuel cell is high, efficiency of the fuel cell system is improved.

Obviously, numerous modifications and variations of the present invention are possible in light of the above teachings. It is therefore to be understood that the invention may be practiced otherwise than as specifically described herein.

What is claimed is:

1. A fuel cell system comprising:
   a fuel cell having a plurality of power generator portions;
   a fluid flow passage connected to the plurality of power generator portions so as to selectively supply a heating or cooling fluid to selected ones of said plurality of power generator portions; and
   at least one switching device associated with the fluid flow passage so as to switch the fluid flow passage to supply heating or cooling fluid to at least one of said plurality of power generator portions.

2. The fuel cell system of claim 1, further comprising a controller operatively connected to the at least one switching device and configured to cause the at least one switching device to switch the fluid flow passage based on the temperature of the fuel cell.

3. The fuel cell system of claim 2, further comprising a heater and a cooler connected to said plurality of power generator portions by said fluid flow passages, wherein said at least one switching device comprises a plurality of valves positioned in said fluid flow passage to selectively permit fluid flow between said fluid flow passage and one of said heater and cooler.

4. The fuel cell system of claim 1, further comprising a controller operatively connected to the at least one switching device and configured to cause the at least one switching device to switch the fluid flow passage when the temperature of the fuel cell is less than a predetermined value.

5. The fuel cell system of claim 1, further comprising a pump for said fluid flow passage, wherein an upstream most one of said plurality of power generator portions, in a direction of fluid flow by said pump, is smaller than others of said plurality of power generator portions.

6. A fuel cell system comprising:
   a fuel cell having a plurality of power generator portions;
   a fuel gas passage connected to selectively supply fuel gas to the power generator portions of said fuel cell; and
   at least one switching device associated with the fuel gas passage so as to switch the fuel gas flow to at least one of said plurality of power generator portions.

7. The fuel cell system of claim 6, further comprising a gas passage controller operatively connected to the at least one switching device and configured to cause the at least one switching device to switch the fuel gas passage to a configuration such that the plurality of power generators will generate a maximum heat output, as compared to other switched configurations of the gas passage, based on the temperature of the fuel cell.

8. The fuel cell system of claim 7, wherein said controller is configured to switch the fuel gas passage such that the fuel gas is supplied to the power generator portion which generates the most heat, when the temperature of the fuel cell is less than a predetermined value.

9. The fuel cell system of claim 6, further comprising a gas passage controller operatively connected to the at least one switching device and configured to cause the at least one switching device to switch the fuel gas passage to a configuration such that the plurality of power generators will generate a maximum heat output, as compared to other switched configurations of the gas passage, when the temperature of the fuel cell is less than a predetermined value.

10. The fuel cell system of claim 9, wherein said controller is configured to switch the fuel gas passage such that a power generation efficiency of the power generator portions becomes high when the temperature of the fuel cell is at least equal to the predetermined value.

11. The fuel cell system of claim 6, wherein an upstream most one of said plurality of power generator portions, in a direction of flow of the fuel gas, is smaller than others of said plurality of power generator portions.

12. A fuel cell system comprising:
   a fuel cell having a plurality of power generator portions;
   fluid flow passage means for selectively supplying a heating or cooling fluid to selected ones of said plurality of power generator portions; and
   switching means for switching the fluid flow passage means to supply heating or cooling fluid to at least one of said plurality of power generator portions.

13. The fuel cell system of claim 12, further comprising control means for causing the switching means to switch the fluid flow passage means based on the temperature of the fuel cell.

14. The fuel cell system of claim 12, further comprising control means for causing the switching means to switch the fluid flow passage means when the temperature of the fuel cell is less than a predetermined value.

15. A fuel cell system comprising:

a fuel cell having a plurality of power generator portions;

fuel gas passage means for selectively supplying fuel gas to the power generator portions of said fuel cell; and switching means for switching a flow of the fuel gas in said fuel gas passage means amongst said plurality of power generator portions.

16. The fuel cell system of claim 15, further comprising control means for causing switching means to switch the fuel gas passage means to a configuration such that the plurality of power generators will generate a maximum heat output, as compared to other switched configurations of the fuel gas passage means, based on the temperature of the fuel cell.

17. The fuel cell system of claim 15, further comprising control means for causing switching means to switch the fuel gas passage means to a configuration such that the plurality of power generators will generate a maximum heat output, as compared to other switched configurations of the fuel gas passage means, when the temperature of the fuel cell is less than a predetermined value.

* * * * *